May 11, 1965     G. T. HUTCHISON     3,182,684
CONTROL VALVE
Filed April 2, 1962
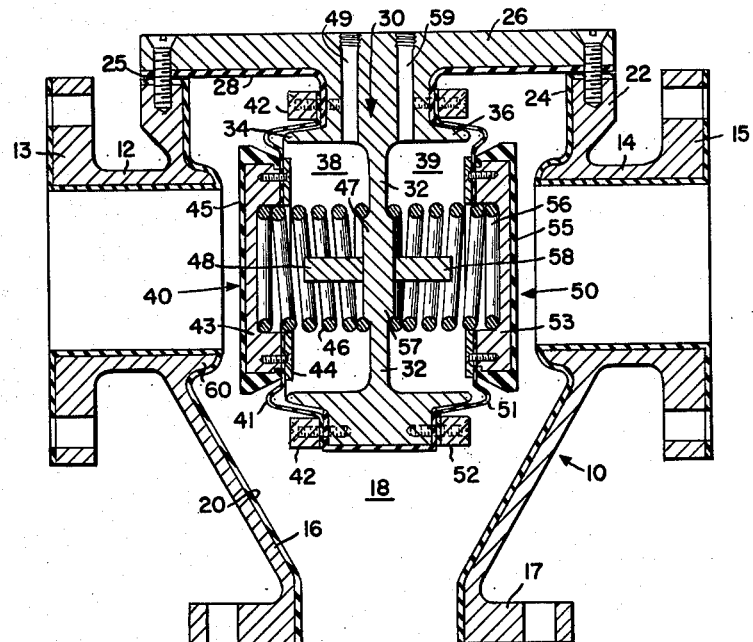
FIG. 1.
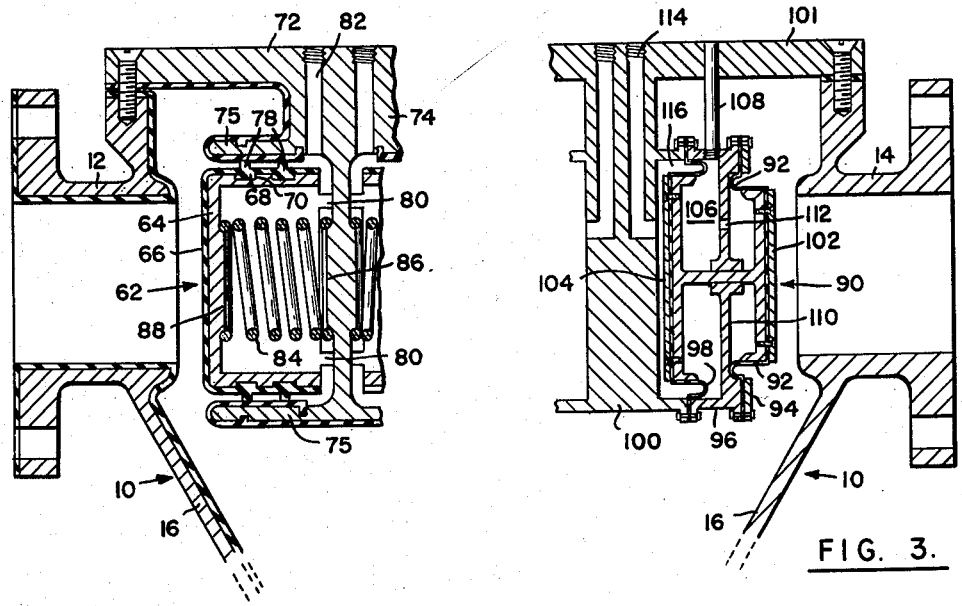
FIG. 2.
FIG. 3.
INVENTOR.
GIBSON T. HUTCHISON
BY
ATTORNEYS

United States Patent Office 3,182,684
Patented May 11, 1965

3,182,684
CONTROL VALVE
Gibson T. Hutchison, Abington, Pa., assignor to Crane Co., Chicago, Ill., a corporation of Illinois
Filed Apr. 2, 1962, Ser. No. 184,131
5 Claims. (Cl. 137—606)

This invention relates to fluid control valves and, more particularly, to the combination of two pressure operated valves arranged within a single housing such that either modulation or on-off flow regulation may be achieved.

One object of the invention is to provide a multiple valve unit which is exceptionally compact and which is therefore usable in areas having minimum space requirements.

It is a further object of the invention to provide a fluid operated, double valve unit within a pipe T.

Yet another object of the invention is to provide a plurality of pressure operated valves which are exceptionally simple in construction and which may be readily installed or removed as a single unit without disconnecting the fluid lines which they control.

The attainment of the foregoing and other objects of the invention, particularly those relating to details of construction and operation, will become more fully apparent from the following description when read in conjunction with the accompanying drawings, wherein:

FIGURE 1 is a cross-sectional view of the double valve unit installed within a pipe T;

FIGURE 2 is a fragmentary cross-sectional view of a second embodiment of the valve unit; and FIGURE 3 is a fragmentary cross-sectional view of a third embodiment of the valve unit.

Referring first to FIGURE 1, numeral 10 designates an integral pipe T having flanged inlet and outlet connections 12, 14 and 16 each of which may function as either an inlet to or an outlet from the central chamber 18 defined by the T. The internal surface of T 10 is provided with a liner 20 which may be composed of rubber or plastic or other material which is resistant to the acid, abrasive or other harmful properties of the fluids being controlled. Of course, it will be readily apparent that inlet and outlet connections 12, 14 and 16 may be provided with threaded portions in lieu of coupling flanges 13, 15 and 17 whereby the T is adapted for connection to the associated conduits which it joins.

The upper portion of the T terminates in an annular collar 22 which defines an opening 24 leading into chamber 18. Opening 24 is adapted to be closed by a removable cover plate 26 which may be bolted to or otherwise secured to the T with a seal 25 disposed therebetween. Cover 26 is also lined at 28 in the same fashion as the inner surface of the T and is integral with a depending partition generally designated 30. Partition 30 includes a relatively thin central portion 32 and a pair of annular projections 34 and 36 extending laterally in opposite directions from portion 32. Thus, central portion 32 and annular projection 34 form the bottom and side of walls of control chamber 38 associated with valve 40 and, similarly, portion 32 and annular projection 36 form the bottom and side walls of chamber 39 associated with valve 50.

Since valves 40 and 50 are identical in construction, only valve 40 will be described in detail. Valve 40 includes a circular diaphragm 41, for example of rubber or other flexible material, the outer periphery of which is clamped between liner 28 and an annular retaining ring 42 which is bolted to or otherwise secured to partition 30. The mid portion of diaphragm 41 is clamped between cup-shaped valve head 43 and a clamping ring 44 which is bolted or otherwise secured to head 43. Valve head 43 is also provided with a protective lining 45 which may be composed of the same material as lining 20. A spring 46 is disposed with one end within the cup of valve head 43 and with its other end abutting the central portion of partition 30, the latter of which is provided with a raised circular portion 47 which acts as a seat to retain the spring in position. In order to limit the maximum displacement of valve head 43, an abutment 48 may be provided and it is to be understood that the abutment may be integral with or otherwise secured to central portion 32. Finally, a partially tapped passage 49 is provided through cover 26 and the upper portion of partition 30 such that it is in communication with control chamber 38, the latter being defined by diaphragm 41, annular projection 34 and portion 32 of partition 30.

In operation, pressurized control fluid which may be different from or identical to the fluid being controlled is selectively admitted to and exhausted from chamber 38 through passage 49 to thereby control the position of valve head 43 with respect to valve seat 60, the latter of which is preferably formed as an integral part of passage 12. As previously stated, valve 50 is identical to valve 40 and, accordingly, elements 51 through 59 directly correspond with elements 41 through 49 both as to structure and function. Thus, valves 40 and 50 form a single unit having a common wall 32 secured to cover 26 and, as a result, both valves may be inserted or removed from the T without disturbing the pipe connections to which passages 12, 14 and 16 are connected.

From the foregoing description of the invention it will be apparent that the combined operation of valves 40 and 50 is subject to numerous variations depending upon whether each of passages 12, 14 and 16 are inlets or outlets with respect to chamber 18. For example, passages 12 and 14 may be inlets and passage 16 may be an outlet. In this instance, valves 40 and 50 would function as independently variable valves to control the proportions of two different fluids which are intermixed in chamber 18 and thereafter pass out through passage 16. On the other hand, passage 16 may be the inlet passage and passages 12 and 14 may be alternative or simultaneous outlet passages. In this instance, the operation of valves 40 and 50 may be interrelated such that when valve 40 is opened, valve 50 is closed. Alternatively, valves 40 and 50 may operate independently to proportion or modulate the simultaneous discharge through both of passages 12 and 14. Of course, it is to be understood that either or both of diaphragms 41 and 51 may be replaced by flexible bellows and that valve heads 43 and 54 may be rigidly interconnected by a common valve stem passing through portion 32 in sealed relationship therewith so that the opening and closing movements of valves 40 and 50 are inversely proportional.

Reference is now made to FIGURE 2 wherein a second form of valve structure is illustrated. This embodiment of the invention differs from that previously described in that valve 62 is composed of an independent, cup-shaped piston 64 which reciprocates within the cylinder formed by annular projection 75. Piston 64 is provided with a separable liner 66 which is retained in position by means of interengaging tongues 68 and groove 70. Similarly, cover 72 and partition 74 are also provided with removable liners retained in position by means of interengaging tongue and groove elements. In addition to protecting piston 64, liner 66 additionally provides integral annular projections 78 which serve as piston rings to effect a fluid-tight seal between the interior and exterior of piston 64. The piston is further provided with abutments 80 which prevent it from closing off communication with inlet and exhaust passage 82 through which control fluid is admitted and exhausted from the interior of piston 64. If desired, a biasing spring 84 may also be interposed between piston 64 and partition 74 in which position it is maintained by seats 86 and 88.

As in the first embodiment of the invention, partition 74 is adapted to support a second piston valve within the cylinder formed by annular projection 77 and it will be understood that this embodiment is therefore capable of achieving the same diversity of operation as previously described with regard to the first embodiment.

Reference is now made to FIGURE 3 wherein a third embodiment of the invention is illustrated. This form of the invention differs from those previously described in that it provides for the employment of a differential area piston 90 whereby the valve may be actuated by a control fluid at a pressure less than the pressure of the fluid being regulated without necessitating the use of a biasing spring. In this form of the invention, the periphery of a first circular diaphragm 92 is clamped between annular ring 94 and cylindrical spacer 96. The periphery of a second diaphragm 98 is clamped between spacer 96 and depending partition 100, the latter of which is integral with cover 101. The mid portions of diaphragms 92 and 98 are clamped to opposite faces of piston 90 by means of retainer discs 102 and 104, respectively. Diaphragms 92 and 98 thereby form an intermediate chamber 106 which may be vented to atmosphere through vent tube 108 or, alternatively, chamber 106 may be sealed with an easily compressible gas contained therein since the change of pressure within chamber 106 upon movement of valve 90 is normally negligible in comparison with the pressures existing within the T. In order to mount valve 90 for reciprocation, spacer 96 includes an integral support 110 which is provided with a port 112 whereby the pressure on opposite sides of the support is equalized. Partition 100 includes a control passage 114 one end of which is in communication with control chamber 116 whereby control fluid may be admitted to and exhausted from the chamber. Since the cross-sectional area of diaphragm 98 is greater than the cross-sectional area of diaphragm 92, the pressure of the control fluid may be less than the pressure within the T, the latter of which may be considerable in high pressure installations. Of course, it is to be understood that a similar valve is positioned on the left hand side of partition 114 whereby a double valve unit is provided. Thus, it will be apparent that the embodiment of the invention described in FIGURE 3 is capable of achieving the same diversity of operation as previously set forth in regard to the first two embodiments.

From the foregoing description it will be obvious that the invention has a wide range of utility throughout hydraulic as well as pneumatic systems and that it is particularly suited for use in complex fluid systems wherein it solves the problem of lack of space since the double valve unit occupies no more space than is required for a standard T connection. In addition, it will be apparent that the valve unit may be inserted or removed from the system without disconnecting the fluid conduits from the T thereby considerably simplifying the installation and maintenance of such complex fluid systems.

Since numerous modifications and alterations of the valve structure will be readily apparent to those skilled in the art, it is to be understood that the above-described embodiments are intended to be illustrative rather than exhaustive and that the invention is not to be limited otherwise than as specifically set forth hereinafter in the appended claims.

What is claimed is:

1. A control valve comprising a pipe fitting including a housing defining a valve chamber therein and a pair of flow passageways in communication with said valve chamber, a valve seat formed on said housing at the location where each of said passages communicates with said valve chamber, said housing having an opening formed therein, cover means positioned so as to close and seal said opening, means for removably securing said cover means in said closed and sealed position, a support means on said cover means extending into said valve chamber, a pair of pressure operated valve means carried by said support means within said valve chamber and mounted for movement relative to said valve seats for controlling flow through said passages, each pressure operated valve means having means defining a control chamber for receiving a pressure operating fluid separate from the other valve means whereby said valve means are operable independently, said valve means being smaller than the size of said opening to permit said cover means, said support means and said valve means too may be removed from said housing as an integral unit.

2. A control valve comprising a pipe T fitting including a housing defining a valve chamber therein and three flow passageways in communication with said valve chamber, two of said passageways communicating with said chamber at spaced opposed locations, a pair of valve seats formed on said housing at the location where each of said last-named passages communicates with said valve chamber whereby said valve seats are in spaced opposed relation, said housing having an opening formed therein, cover means positioned so as to close and seal said aperture, means for removably securing said cover means in said closed and sealed position, a support means on said cover means extending into said valve chamber, a pair of pressure operated valve means carried by said support means within said valve chamber and including valve members mounted for movement relative to said valve seats for controlling flow through said passages, each pressure operated valve means having means defining a control chamber for receiving a pressure operating fluid separate from the other valve means whereby said valve means are operable independently, said valve means being smaller than the size of said opening to permit said cover means, said support means and said valve means to be removed from said housing as an integral unit.

3. A valve according to claim 2 wherein said valve members are shaped to provide a flat wall to cooperate with said valve seat, each of said flat walls extending parallel to the direction which the valve means are moved during removal from said housing.

4. A control valve according to claim 2 wherein said support means comprises a partition wall extending perpendicularly from said cover means into said valve chamber between the opposed valve seats, said valve members being mounted on opposite sides of said partition for movement toward and away from said valve seats.

5. A valve according to claim 4 wherein said valve members are shaped to provide a flat wall to cooperate with said valve seat, each of said flat walls extending parallel to the direction which the valve means are moved during removal from said housing.

References Cited by the Examiner

UNITED STATES PATENTS

| 1,259,639 | 3/18 | Laing | 137—454.6 |
| 2,085,893 | 7/37 | Boland | 137—628 XR |
| 2,454,160 | 11/48 | Greene | 137—375 |
| 2,469,109 | 5/49 | Goecke | 137—375 |
| 2,825,359 | 3/58 | Williams | 137—608 |
| 2,897,836 | 8/59 | Peters et al. | 137—454.5 |
| 2,988,108 | 6/61 | Malmquist et al. | 137—625.46 |
| 3,038,488 | 6/62 | Welch et al. | 251—61 XR |

LAVERNE D. GEIGER, *Primary Examiner.*

ISADOR WEIL, *Examiner.*